(12) United States Patent
Hartman et al.

(10) Patent No.: US 9,420,674 B2
(45) Date of Patent: Aug. 16, 2016

(54) SYSTEM AND METHOD FOR MONITORING STREET LIGHTING LUMINAIRES

(71) Applicant: General Electric Company, Schenectady, NY (US)

(72) Inventors: Michael James Hartman, Clifton Park, NY (US); John Erik Hershey, Ballston Lake, NY (US); Michael Joseph Dell'Anno, Clifton Park, NY (US); Stanislava Soro, Niskayuna, NY (US); Bruce Gordon Barnett, Troy, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/484,300

(22) Filed: Sep. 12, 2014

(65) Prior Publication Data

US 2015/0137684 A1    May 21, 2015

Related U.S. Application Data

(60) Provisional application No. 61/907,133, filed on Nov. 21, 2013.

(51) Int. Cl.
*H05B 37/03* (2006.01)
*H05B 33/08* (2006.01)
*H05B 37/02* (2006.01)

(52) U.S. Cl.
CPC .......... *H05B 37/034* (2013.01); *H05B 33/0815* (2013.01); *H05B 33/0845* (2013.01); *H05B 37/0254* (2013.01); *Y02B 20/72* (2013.01)

(58) Field of Classification Search
USPC ............... 315/291, 307–326, 185 S, 224, 247
IPC ........ H05B 41/2828,33/0842, 37/025, 37/0218, H05B 33/0839, 37/0227, 33/0845, 33/0869, H05B H05B 41/2925, 41/2928, 41/2851, H05B 41/28534
See application file for complete search history.

(56) References Cited

U.S. PATENT DOCUMENTS

| 4,704,610 A | 11/1987 | Smith et al. |
| 5,014,052 A | 5/1991 | Obeck |

(Continued)

FOREIGN PATENT DOCUMENTS

| EP | 1437270 A1 | 7/2004 |
| EP | 2131630 A2 | 12/2009 |

(Continued)

OTHER PUBLICATIONS

U.S. Appl. No. 14/543,892, filed Nov. 18, 2014, Hershey et al.

(Continued)

*Primary Examiner* — Tuyet Vo
(74) *Attorney, Agent, or Firm* — Mary Louise Stanford

(57) ABSTRACT

A system for identifying a fault in a light source is presented. The system includes at least one luminaire that includes the light source configured to emit light. Also, the at least one luminaire includes a monitoring device disposed proximate to the light source. The monitoring device includes a sensing unit configured to measure an amount of light emitted by the light source, and a squawk unit configured to generate a squawk signal based on the amount of light emitted from the light source, where the squawk signal is indicative of the fault in the light source. Further, the system includes a diagnostic unit communicatively coupled to the at least one luminaire and configured to determine the fault in the light source based on the squawk signal, and transmit a termination signal to the squawk unit to decouple an electrical power supply from the light source.

15 Claims, 2 Drawing Sheets

(56) References Cited

U.S. PATENT DOCUMENTS

| | | | |
|---|---|---|---|
| 5,199,044 A | 3/1993 | Takeuchi et al. |
| 5,243,185 A | 9/1993 | Blackwood |
| 5,345,232 A | 9/1994 | Robertson |
| 5,519,692 A | 5/1996 | Hershey et al. |
| 5,519,725 A | 5/1996 | Hershey et al. |
| 5,526,357 A | 6/1996 | Jandrell |
| 5,563,906 A | 10/1996 | Hershey et al. |
| 5,568,507 A | 10/1996 | Hershey et al. |
| 5,568,508 A | 10/1996 | Hershey |
| 5,568,509 A | 10/1996 | Hershey et al. |
| 5,568,522 A | 10/1996 | Hershey et al. |
| 5,682,100 A | 10/1997 | Rossi et al. |
| 5,761,238 A | 6/1998 | Ross et al. |
| 5,844,949 A | 12/1998 | Hershey et al. |
| 5,852,243 A | 12/1998 | Chang et al. |
| 5,903,594 A | 5/1999 | Saulnier et al. |
| 6,011,508 A | 1/2000 | Perreault et al. |
| 6,101,214 A | 8/2000 | Hershey et al. |
| 6,288,632 B1 | 9/2001 | Hoctor et al. |
| 6,346,875 B1 | 2/2002 | Puckette et al. |
| 6,424,250 B1 | 7/2002 | Puckette, IV et al. |
| 6,430,210 B1 | 8/2002 | McGrath et al. |
| 6,433,976 B1* | 8/2002 | Phillips ............ G01R 31/1218 361/42 |
| 6,459,998 B1 | 10/2002 | Hoffman |
| 6,522,243 B1 | 2/2003 | Saulnier et al. |
| 6,659,715 B2 | 12/2003 | Kuesters et al. |
| 6,717,660 B1 | 4/2004 | Bernardo |
| 6,943,668 B2 | 9/2005 | Gaus, Jr. et al. |
| 7,175,082 B2 | 2/2007 | Hoshina |
| 7,248,149 B2 | 7/2007 | Bachelder et al. |
| 7,294,977 B1 | 11/2007 | Eusterbrock et al. |
| 7,333,903 B2 | 2/2008 | Walters et al. |
| 7,418,346 B2 | 8/2008 | Breed et al. |
| 7,460,787 B2 | 12/2008 | Damink et al. |
| 7,580,705 B2 | 8/2009 | Kumar |
| 7,629,899 B2 | 12/2009 | Breed |
| 7,646,330 B2 | 1/2010 | Karr |
| 7,817,063 B2 | 10/2010 | Hawkins et al. |
| 7,834,555 B2 | 11/2010 | Cleland et al. |
| 7,855,376 B2 | 12/2010 | Cantin et al. |
| 7,876,864 B2 | 1/2011 | Conrad et al. |
| 7,899,621 B2 | 3/2011 | Breed et al. |
| 7,912,645 B2 | 3/2011 | Breed et al. |
| 7,983,685 B2 | 7/2011 | Silverstrim et al. |
| 7,983,836 B2 | 7/2011 | Breed |
| 8,138,690 B2 | 3/2012 | Chemel et al. |
| 8,140,276 B2 | 3/2012 | Walters et al. |
| 8,227,995 B2 | 7/2012 | Damink et al. |
| 8,232,745 B2 | 7/2012 | Chemel et al. |
| 8,244,260 B2 | 8/2012 | Silverstrim et al. |
| 8,260,537 B2 | 9/2012 | Breed |
| 8,274,373 B2 | 9/2012 | Nysen |
| 8,339,069 B2 | 12/2012 | Chemel et al. |
| 8,368,321 B2 | 2/2013 | Chemel et al. |
| 8,373,362 B2 | 2/2013 | Chemel et al. |
| 8,384,312 B2 | 2/2013 | Tsai |
| 8,436,748 B2 | 5/2013 | Mimeault et al. |
| 8,441,214 B2 | 5/2013 | Anderson |
| 8,442,403 B2 | 5/2013 | Weaver |
| 8,456,325 B1 | 6/2013 | Sikora |
| 8,842,009 B2* | 9/2014 | Jones ................ H05B 37/0272 340/468 |
| 2002/0141882 A1 | 10/2002 | Ingistov et al. |
| 2005/0017647 A1* | 1/2005 | Huang ................ G09G 3/3406 315/119 |
| 2005/0187701 A1 | 8/2005 | Baney |
| 2007/0201540 A1 | 8/2007 | Berkman |
| 2007/0229250 A1 | 10/2007 | Recker et al. |
| 2008/0037241 A1 | 2/2008 | Von Der Brelie |
| 2008/0072766 A1 | 3/2008 | Kobylarz |
| 2008/0122642 A1 | 5/2008 | Radtke et al. |
| 2008/0150757 A1 | 6/2008 | Hutchison |
| 2008/0238720 A1 | 10/2008 | Lee |
| 2009/0002982 A1 | 1/2009 | Hu et al. |
| 2009/0034258 A1 | 2/2009 | Tsai et al. |
| 2009/0066540 A1 | 3/2009 | Marinakis et al. |
| 2009/0120299 A1 | 5/2009 | Rahn et al. |
| 2009/0158739 A1 | 6/2009 | Messmer |
| 2009/0164174 A1 | 6/2009 | Bears et al. |
| 2009/0214198 A1* | 8/2009 | Takahashi ............ H01S 5/06825 398/1 |
| 2009/0297156 A1 | 12/2009 | Nakagawa et al. |
| 2010/0115093 A1 | 5/2010 | Rice |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0295943 A1 | 11/2010 | Cha et al. |
| 2010/0296285 A1 | 11/2010 | Chemel et al. |
| 2010/0301768 A1 | 12/2010 | Chemel et al. |
| 2010/0301770 A1 | 12/2010 | Chemel et al. |
| 2010/0301771 A1 | 12/2010 | Chemel et al. |
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302779 A1 | 12/2010 | Chemel et al. |
| 2011/0001436 A1 | 1/2011 | Chemel et al. |
| 2011/0001438 A1 | 1/2011 | Chemel et al. |
| 2011/0001626 A1 | 1/2011 | Yip et al. |
| 2011/0043035 A1 | 2/2011 | Yamada et al. |
| 2011/0069960 A1 | 3/2011 | Knapp et al. |
| 2011/0095867 A1 | 4/2011 | Ahmad |
| 2011/0115384 A1 | 5/2011 | Chatelus |
| 2011/0140950 A1 | 6/2011 | Andersson |
| 2011/0215736 A1 | 9/2011 | Horbst et al. |
| 2011/0227584 A1 | 9/2011 | Beck |
| 2011/0288658 A1 | 11/2011 | Walters et al. |
| 2012/0062123 A1 | 3/2012 | Jarrell et al. |
| 2012/0086560 A1 | 4/2012 | Ilyes et al. |
| 2012/0086561 A1 | 4/2012 | Ilyes et al. |
| 2012/0126721 A1 | 5/2012 | Kuenzler et al. |
| 2012/0136485 A1 | 5/2012 | Weber et al. |
| 2012/0140748 A1 | 6/2012 | Carruthers |
| 2012/0154239 A1 | 6/2012 | Bar-Sade et al. |
| 2012/0163826 A1 | 6/2012 | Schenk et al. |
| 2012/0209505 A1 | 8/2012 | Breed et al. |
| 2012/0218101 A1 | 8/2012 | Ford |
| 2012/0230696 A1 | 9/2012 | Pederson et al. |
| 2012/0245880 A1 | 9/2012 | Nabrotzky |
| 2012/0256777 A1 | 10/2012 | Smith et al. |
| 2012/0262304 A1 | 10/2012 | Cripps |
| 2012/0286673 A1 | 11/2012 | Holland et al. |
| 2012/0308239 A1 | 12/2012 | Sheth et al. |
| 2012/0309293 A1 | 12/2012 | Kummetz et al. |
| 2012/0321321 A1 | 12/2012 | Riesebosch |
| 2012/0323474 A1 | 12/2012 | Breed et al. |
| 2013/0044488 A1 | 2/2013 | Hreish |
| 2013/0057158 A1 | 3/2013 | Josefowicz et al. |
| 2013/0101003 A1 | 4/2013 | Vedantham et al. |
| 2013/0140995 A1 | 6/2013 | Jones |
| 2013/0169468 A1 | 7/2013 | Johnson et al. |
| 2013/0172012 A1 | 7/2013 | Zudrell-Koch |
| 2013/0181636 A1 | 7/2013 | Agrawal |
| 2013/0214697 A1 | 8/2013 | Archenhold |
| 2013/0229116 A1 | 9/2013 | Van Zeijl et al. |
| 2013/0257284 A1 | 10/2013 | VanWagoner et al. |
| 2013/0293117 A1 | 11/2013 | Verfuerth |
| 2013/0330172 A1 | 12/2013 | Scipio et al. |
| 2014/0055439 A1* | 2/2014 | Lee ...................... H05B 37/036 345/212 |
| 2014/0124007 A1 | 5/2014 | Scipio et al. |
| 2014/0175982 A1* | 6/2014 | Yao ...................... H05B 41/2981 315/119 |

FOREIGN PATENT DOCUMENTS

| | | |
|---|---|---|
| EP | 2521426 A1 | 11/2012 |
| GB | 2403357 A | 12/2004 |
| JP | 2005248607 A | 9/2005 |
| JP | 2009025209 A | 2/2009 |
| JP | 2009103497 A | 5/2009 |
| KR | 1020060008967 A | 1/2006 |
| KR | 1020060102552 A | 9/2006 |

(56) References Cited

FOREIGN PATENT DOCUMENTS

| | | |
|---|---|---|
| KR | 100986279 B1 | 10/2010 |
| WO | 2005029437 A2 | 3/2005 |
| WO | 2009148466 A1 | 12/2009 |
| WO | 2010079388 A1 | 7/2010 |
| WO | 2011142516 A1 | 11/2011 |
| WO | 2012090142 A2 | 7/2012 |
| WO | 2012140152 A1 | 10/2012 |
| WO | 2013160791 A2 | 10/2013 |

OTHER PUBLICATIONS

U.S. Appl. No. 14/546,954, filed Nov. 18, 2014, Hartman et al.
U.S. Appl. No. 14/546,408, filed Nov. 18, 2014, Hartman et al.
U.S. Appl. No. 14/546,982, filed Nov. 18, 2014, Hartman et al.
U.S. Appl. No. 14/546,486, filed Nov. 18, 2014, Hartman et al.
U.S. Appl. No. 14/546,916, filed Nov. 18, 2014, Hartman et al.
U.S. Appl. No. 14/546,256, filed Nov. 18, 2014, Barnett et al.
U.S. Appl. No. 14/546,856, filed Nov. 18, 2014, Hartman et al.
International Search Report and Written Opinion issued in connection with corresponding PCT Application No. PCT/US2014/066927 dated Feb. 27, 2015.
"Monitoring and Evaluation Protocol for the Field Performance of LED Street Lighting Technologies", Light Savers Accelerating Advanced Outdoor Lighting, pp. 5-32, 2011.
Atlas, "Optical Extinction by Rainfall", Journal of Meteorology, vol. No. 10, pp. 486-488, Dec. 1953.
Noe et al., "Global Positioning System, A Navigation Algorithm for the Low-Cost GPS Receiver", The Institute of Navigation, vol. No. 1, pp. 166-172, 1980.
Proakis, "Spread Spectrum Signals for Digital Communication," in Digital Communications, for an overview of DS theory, pp. 1-27, 1983.
Hershey et al., "Random and Pseudorandom Sequences," Data Transportation and Protection, pp. 259-310, 1986.
"Millimeter Wave Propagation: Spectrum Management Implications" published by the FCC as Bulletin No. 70, Jul. 1997.
Pang et al., "LED Traffic Light as a Communications Device", Proceedings of the International Conference on Intelligent Transportation Systems, pp. 788-793, 1999.
Mimbela et al., "A Summary of Vehicle Detection and Surveillance Technologies Used in Intelligent Transportation Systems", Southwest Technology Development Institute, pp. 1-211, Nov. 30, 2000.
Bullimore, "Controlling Traffic With Radio", IEEE Review, vol. No. 47, Issue No. 1, pp. 40-44, Jan. 2001.
Chao-Qun et al., "Application of Low-voltage Power Line Communication in a City Street Lamp Long-distance Intelligent Monitoring System", Research and Developments, 2006.
Cho et al., "Street Lighting Control Based on LonWorks Power Line Communication", Power Line Communications and Its Applications, pp. 396-398, Apr. 2008.
Awan et al., "Characterization of Fog and Snow Attenuations for Free-Space Optical Propagation", Journal of Communications, vol. No. 4, Issue No. 8, pp. 533-545, Sep. 2009.
Rich, "Light Monitoring System Keeps Glendale, Ariz., Out of the Dark", Government Technology, Oct. 24, 2011.
Qian et. al., "Based on PLC and GPRS, ZigBee street lamp wireless control system", Electronic Design Engineering, vol. No. 20, Issue No. 3, Feb. 2012.
Stevens et al., "White Paper—The Benefits of 60 GHz Unlicensed Wireless Communications" as captured by Wayback machine, SUB10 systems.com, pp. 1-10, May 7, 2012.
"Wireless Control and Communication System for LED Luminaires and Other Devices", San Francisco Public Utilities Commission Power Enterprise, pp. 1-15, Jun. 7, 2012.
Zotos et al., "Case study of a dimmable outdoor lighting system with intelligent management and remote control", Telecommunications and Multimedia (TEMU), 2012 International Conference on, pp. 43-48, Jul. 30-Aug. 1, 2012.
Caillet et al., "LonMark, the open Smart Streetlight Platform", Lonmark International, pp. 1-16, Feb. 2013.
After Newtown: A new use for a weapons-detecting radar?, University of Michigan, Apr. 1, 2013.
Lee et al., "Distributed dimming control for LED lighting", Optics Express, vol. No. 21, Issue No. S6, pp. 1-16, Nov. 2013.
International Search Report and Written Opinion issued in connection with related PCT Application No. PCT/US2014/066954 dated Feb. 26, 2015.
International Search Report and Written Opinion issued in connection with related PCT Application No. PCT/US2014/066922 dated Feb. 26, 2015.
International Search Report and Written Opinion issued in connection with related PCT Application No. PCT/US2014/066957 dated Mar. 5, 2015.
International Search Report and Written Opinion issued in connection with related PCT Application No. PCT/US2014/066917 dated Mar. 5, 2015.
International Search Report and Written Opinion issued in connection with related PCT Application No. PCT/US2014/066337 dated Mar. 6, 2015.
International Search Report and Written Opinion issued in connection with related PCT Application No. PCT/US2014/066948 dated Mar. 9, 2015.
International Search Report and Written Opinion issued in connection with related PCT Application No. PCT/US2014/066942 dated Mar. 20, 2015.

* cited by examiner

SYSTEM AND METHOD FOR MONITORING STREET LIGHTING LUMINAIRES

CROSS REFERENCE TO RELATED APPLICATIONS

This application is a non-provisional application of U.S. Provisional Patent Application No. 61/907,133, entitled "MONITORING STREET LIGHTING LUMINAIRES," filed 21 Nov. 2013, which is herein incorporated by reference.

BACKGROUND

Embodiments of the present specification relate generally to street lighting, and more particularly to a system and method for monitoring street lighting luminaires.

It is desirable to ensure that adequate street lighting is provided on the streets for the safety of pedestrians and motorized and non-motorized vehicle operators and passengers. However, operating and maintaining street lighting entail considerable expenditure. Typically, conventional lighting, such as incandescent lighting is costly to operate and maintain. Accordingly, city infrastructure authorities are currently working towards replacing conventional lighting with light-emitting diode (LED) lighting. Also, in some locations, there is a drive to use LED lighting for newly installed street lighting.

One of the challenges with LED lighting when compared with that of the conventional lighting is the assessment of an operating condition of the LED lighting. For example, when a conventional lamp has burnt out or has aged, the conventional lamp does not draw any electrical current. Accordingly, the operating condition of the conventional lamp may be assessed by monitoring the electrical current flowing through the lamp. On the other hand, when the LED lighting is burnt out or has aged, the intensity of the LED becomes dimmer, however, the LED lighting still draws an electrical current. Hence, monitoring the LED lighting to assess the working condition of the LED lighting is a challenging task.

BRIEF DESCRIPTION

In accordance with aspects of the present specification, a system for identifying a fault in a light source is presented. The system includes at least one luminaire that includes the light source configured to emit light. Also, the at least one luminaire includes a monitoring device disposed proximate to the light source. The monitoring device includes a sensing unit configured to measure an amount of light emitted by the light source, and a squawk unit electrically coupled to the sensing unit and configured to generate a squawk signal based on the amount of light emitted from the light source, where the squawk signal is indicative of the fault in the light source. Further, the system includes a diagnostic unit communicatively coupled to the at least one luminaire and configured to determine the fault in the light source based on the squawk signal, and transmit a termination signal to the squawk unit to decouple an electrical power supply from the light source.

In accordance with a further aspect of the present disclosure, a luminaire system is presented. The luminaire system includes a light source configured to emit light. Also, the luminaire system includes a sensing unit disposed proximate to the light source and configured to measure an amount of light emitted from the light source. Further, the luminaire system includes a squawk unit electrically coupled to the sensing unit and configured to generate a squawk signal based on the amount of light emitted from the light source, where the squawk signal is indicative of a fault in the light source, communicate the squawk signal to a diagnostic unit, and decouple an electrical power supply from the light source based on a termination signal received from the diagnostic unit.

In accordance with another aspect of the present disclosure, a method is presented. The method includes measuring, by a sensing unit, light emitted from a light source. Further, the method includes generating, by a squawk unit, a squawk signal based on an amount of light emitted from the light source, where the squawk signal is indicative of a fault in the light source. Also, the method includes communicating, by the squawk unit, the squawk signal to a diagnostic unit. In addition, the method includes decoupling an electrical power supply from the light source based on a termination signal received from the diagnostic unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for determining a malfunction in one or more light sources in a street lighting subsystem are presented. By employing the methods and the various embodiments of the systems described hereinafter, light emitted from a light source is evaluated and the condition of the light source is determined accordingly. Moreover, the existing power line of the street lighting subsystem may be utilized for monitoring the condition of the light source, which in turn substantially reduces the cost of operating and maintaining the street lighting subsystem.

Figure 1:
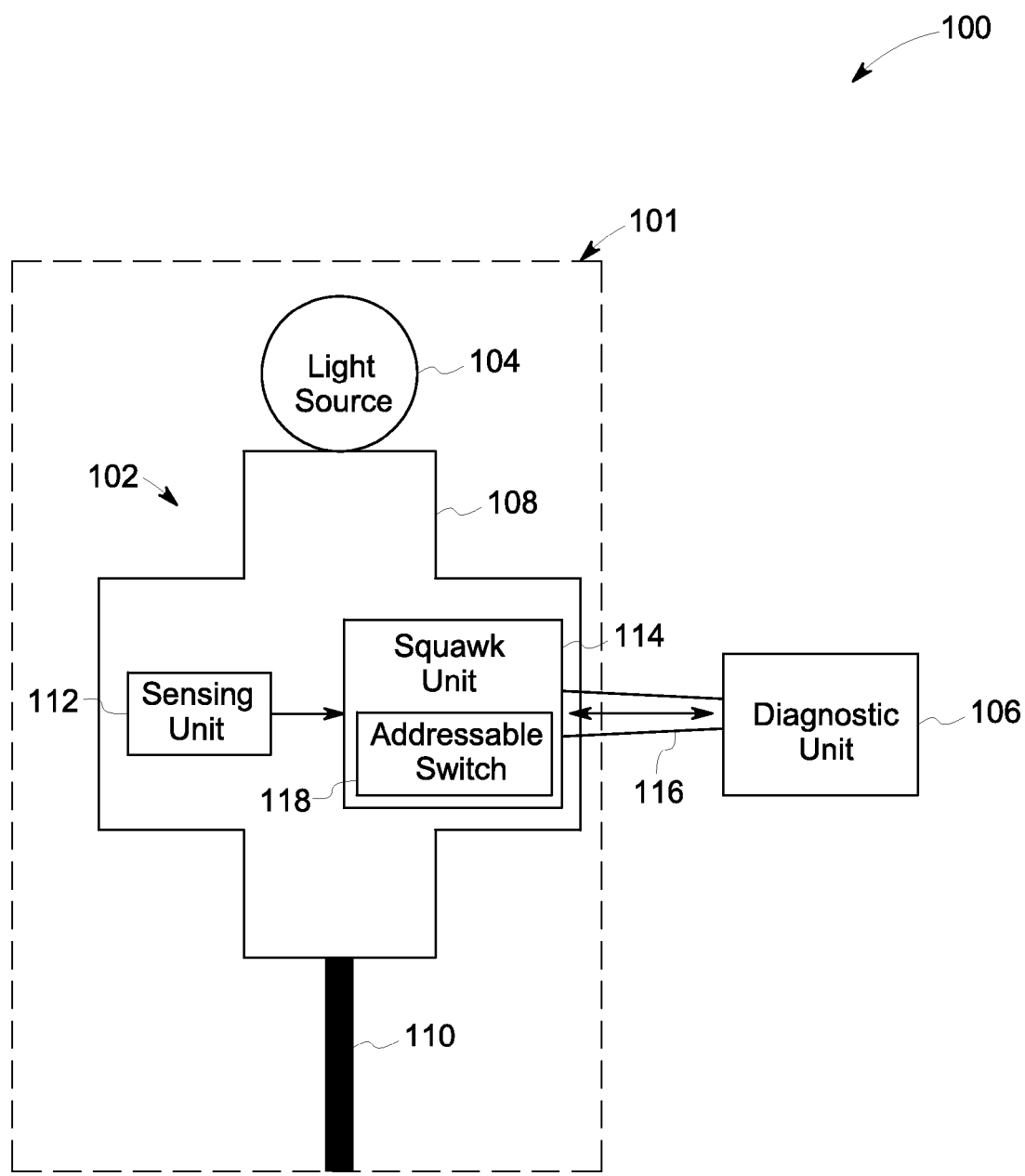
FIG. 1 is a diagrammatical representation of a system for monitoring a street lighting subsystem, in accordance with aspects of the present specification.

Turning now to the drawings and referring to FIG. 1, a diagrammatical representation 100 of a system for monitoring a street lighting subsystem 101, in accordance with aspects of the present specification, is depicted. The exemplary system 100 may be used for identifying a fault or malfunction in one or more light sources in the street lighting subsystem 101. In one example, the dimming of the intensity of a light source or a burnt out light source may be indicative of a faulty light source.

The system 100 may include a diagnostic unit 106. In one example, the street lighting subsystem 101 may be communicatively coupled to the diagnostic unit 106. Particularly, the street lighting subsystem 101 may include one or more luminaires that are communicatively coupled to the diagnostic unit 106. For ease of understanding, the street lighting subsystem 101 is depicted with a single luminaire 102. It may be noted that the street lighting subsystem 101 may include any number of luminaires to illuminate a geographic location, and is not limited to one luminaire 102 as shown in FIG. 1. In one example, a plurality of luminaires may be linearly or non-linearly arranged along a street to provide adequate lighting to pedestrians and motorized and non-motorized vehicle operators and passengers on the street. Moreover, in one embodiment, the luminaire 102 may be coupled to the diagnostic unit 106 via a power cable 116 that is used for supplying electrical power to the luminaire 102.

Further, the luminaire 102 may include a light source 104, a monitoring device 108, and a lamp post 110. In one example, the light source 104 is operatively coupled to the monitoring device 108. The light source 104 may be a light-emitting diode (LED) source that emits light to illuminate a location surrounding the luminaire 102. Further, the monitoring device 108 is operatively coupled to the lamp post 110. The monitoring device 108 may be configured to determine a working condition of the light source 104. In one example, the monitoring device 108 may be configured to determine the working condition of the light source 104 by measuring an amount of light emitted from the light source 104. In one embodiment, the monitoring device 108 may be detachably coupled to the light source 104. In another embodiment, the monitoring device 108 and the light source 104 may be disposed in a single unit. Further, the monitoring device 108 along with the light source 104 may be mounted on the lamp post 110. In general, the lamp post 110 may be used to elevate the light source 104 to a determined height from the ground.

In a presently contemplated configuration, the monitoring device 108 may include a sensing unit 112 and a squawk unit 114. The sensing unit 112 and the squawk unit 114 may be electrically coupled to each other. Further, the sensing unit 112 may be positioned proximate to the light source 104. The sensing unit 112 may be used to determine an amount of light emitted from the light source 104. In one example, the sensing unit 112 may include one or more photocells that are used to sense the light emitted from the light source 104. It may be noted that the sensing unit 112 may include any type of photo-detector to detect the light emitted from the light source 104.

Furthermore, the sensing unit 112 may also be configured to determine and/or monitor an intensity of the light emitted from the light source 104. In one example, the sensing unit 112 may be configured to generate an electrical signal that is representative of the emitted light from the light source 104. It may be noted that if the amount of light emitted by the light source 104 is below a threshold value, it may be representative of a fault or malfunction in the light source 104. Accordingly, the sensing unit 112 may be configured to compare this electrical signal with the threshold value to determine whether the emitted light from the light source 104 is below the threshold value. If the emitted light is below the threshold value, the sensing unit 112 may be configured to generate a triggering signal. Additionally, the sensing unit 112 may be configured to communicate the triggering signal to the squawk unit 114.

Upon receiving the triggering signal, the squawk unit 114 may be configured to generate a squawk signal. Further, the squawk unit 114 may be configured to communicate the generated squawk signal to the diagnostic unit 106. In one example, the squawk signal may include one or more tones that are generated at a determined frequency to indicate that the light source 104 is malfunctioning. Moreover, the squawk unit 114 may be configured to continuously generate the squawk signal until the electrical power supply to the light source 104 is decoupled. In one embodiment, the squawk signal may include an address associated with the luminaire 102. This address may be utilized by the diagnostic unit 106 to identify the luminaire 102 among a plurality of luminaires (not show in FIG. 1) in the street. In another embodiment, the squawk signal may include the determined amount of light emitted from the light source 104 and the address associated with the luminaire 102. This information may be used by the diagnostic unit 106 to determine a type of fault that has occurred in the luminaire 102.

In the embodiment of FIG. 1, the squawk unit 114 may be configured to communicate the squawk signal to the diagnostic unit 106 over the existing power cable 116 that is used for supplying the electrical power to the light source 104. As the existing power cable 116 is used for communicating the squawk signal, the squawk unit 114 may be configured to transmit the squawk signal having multiple tones to overcome multipath effects and/or attenuation effects in the power cable 116. Also, use of the existing power cable 116 to transmit the squawk signal aids in reducing the cost involved in maintaining and operating the system 100.

In another embodiment, the squawk unit 114 may be configured to aerially communicate the squawk signal to the diagnostic unit 106. This squawk signal may also be referred to as a sound-based squawk signal. In this embodiment, the squawk unit 114 may be configured to emit or radiate the squawk signal at an ultrasonic or infrasonic frequency, thereby minimizing any nuisance to the pedestrians and/or motorists on the street. It may be noted that the squawk signal may be emitted at any frequency, and is not limited to the ultrasonic or infrasonic frequency. Further, the diagnostic unit 106 may be configured to aerially receive this squawk signal.

Upon receiving the squawk signal from the squawk unit 114, the diagnostic unit 106 may be configured to analyze the squawk signal to determine the operating condition of the light source 104. Particularly, the diagnostic unit 106 may be configured to identify the one or more tones in the squawk signal that may be present along with the noise or other signals. In one example, the diagnostic unit 106 may employ one or more narrowband filtering techniques to identify the tones in the squawk signal.

Further, based on the analysis of the identified tones in the squawk signal, the diagnostic unit 106 may be configured to transmit a termination signal to the squawk unit 114. In one example, the termination signal may include an address associated with the luminaire 102. Further, the squawk unit 114 may receive the termination signal only if the address associated with a corresponding luminaire is present in the termination signal. On receipt of the termination signal, the squawk unit 114 may be configured to decouple/stop the electrical power supply to the light source 104. In one embodiment, the diagnostic unit 106 may be configured to transmit the termination signal to an addressable switch 118 disposed in the squawk unit 114. The addressable switch 118 in the squawk unit 114 may be configured to decouple the electrical power to the light source 104 based on the received termination signal. Also, in one embodiment, the diagnostic unit 106 may be configured to communicate a fault signal to an operator device, where the fault signal is indicative of a faulty light source 104 in the street lighting system 100.

Thus, the exemplary system 100 may be configured to effectively identify a fault or malfunction in the light source 104 and decouple electrical power supply to the faulty light source 104. Also, a signal indicative of a desired replacement and/or repair of a faulty light source 104 may be communicated to the operator.

Figure 2:
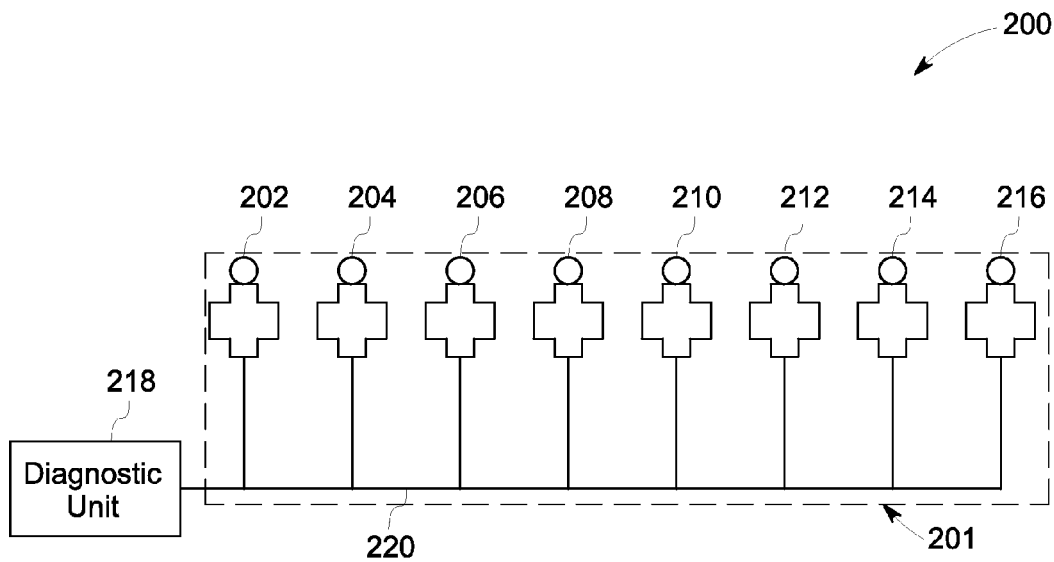
FIG. 2 is a diagrammatical representation of another embodiment of a system for monitoring a street lighting subsystem, in accordance with aspects of the present specification.

Referring now to FIG. 2, a diagrammatical representation of another embodiment of a system 200 for monitoring a street lighting subsystem 201, in accordance with aspects of the present specification, is depicted. The street lighting subsystem 201 may include a plurality of luminaires 202, 204, 206, 208, 210, 212, 214, 216 that are communicatively coupled to a diagnostic unit 218. It may be noted that each of the plurality of luminaires 202-216 may be representative of the luminaire 102 shown in FIG. 1. Also, each of the plurality of luminaires 202-216 may include a corresponding light source, a sensing unit, and a squawk unit. The light source is configured to emit light and the sensing unit is used to monitor the light source to determine whether the emitted light is below a threshold value. Further, the squawk unit is used to generate a squawk signal if the emitted light is below the threshold value. Also, the diagnostic unit 218 may be representative of the diagnostic unit 106 shown in FIG. 1.

As shown in FIG. 2, the street lighting subsystem 201 includes the luminaires 202-216 that are coupled to a power line 220. It may be noted that the street lighting system 201 may include any number of luminaires, and is not limited to the number of luminaires shown in FIG. 2. Also, the diagnostic unit 218 may be connected to the same power line 220 to which the luminaires 202-216 are connected.

Further, if a luminaire among the plurality of luminaires 202-216 fails to emit light above the threshold value as sensed by a corresponding sensing unit, the associated squawk unit may be configured to transmit a squawk signal from the faulty luminaire to the diagnostic unit 218. In one example, if luminaire 202 is malfunctioning, the diagnostic unit 218 may continuously receive the squawk signal from the luminaire 202 until the electrical power supply to that luminaire 202 is decoupled. Particularly, the luminaire 202 may transmit the squawk signal to the diagnostic unit 218 until a termination signal is received from the diagnostic unit 218, and the electrical power supply to the light source in the luminaire 202 is decoupled via use of an addressable switch in the luminaire 202.

In one embodiment, the diagnostic unit 218 may be configured to process the squawk signal that may include noise and/or other signals. The diagnostic unit 218 may be configured to process the squawk signal to recognize one or more tones in the squawk signal. The one or more tones may be at a determined frequency. As will be appreciated, the diagnostic unit 218 may receive different types of signals from external devices including the luminaires 202-216, thereby enhancing the complexity of identification of the squawk signal among these signals by the diagnostic unit 218. Therefore, the diagnostic unit 218 may be configured to process each of these signals to verify the presence of one or more tones in the signals. If the signal includes one or more tones, then the diagnostic unit 218 may be configured to identify the corresponding signal as a squawk signal. In one example, the diagnostic unit 218 may employ narrowband filtering techniques to identify the one or more tones in the squawk signal. In one embodiment, the squawk signals may also include an address of a corresponding luminaire. Accordingly, the diagnostic unit 218 may be configured to extract this address to identify the luminaire that is malfunctioning, thereby allowing timely identification of a malfunctioning luminaire. In one embodiment, the squawk signal may be affected/diminished by standing wave interference on the power line 220. However, by including the plurality of tones in the squawk signal, the squawk signal may overcome the ability of standing wave interference on the power line to diminish the squawk signal.

In accordance with other aspects of the present specification, the luminaires 202-216 may be configured to transmit the squawk signals that do not include the address of a corresponding luminaire. For example, one or more malfunctioning luminaires may transmit substantially similar squawk signals to the diagnostic unit 218. Accordingly, in this embodiment, the diagnostic unit 218 may be configured to identify one or more malfunctioning luminaire using the squawk signals. More particularly, in this embodiment, the diagnostic unit 218 may be configured to identify the one or more malfunctioning luminaires by using a sequential testing protocol. As per the sequential testing protocol, the diagnostic unit 218 may be configured to sequentially deactivate individual luminaires or a group of luminaires in the plurality of luminaires for a determined time period. Further, during this time period, the diagnostic unit 218 may be configured to verify receipt of the squawk signals from the individual luminaires or the group of luminaires. If no squawk signals are received, then the diagnostic unit 218 may be configured to confirm that the deactivated luminaires include one or more malfunctioning luminaires.

Similarly, if no squawk signals are received after deactivating a single luminaire, then the diagnostic unit 218 may be configured to confirm that this single luminaire is a malfunctioning luminaire. In a similar manner, if no squawk signals are received after deactivating a group of luminaires, then the diagnostic unit 218 may be configured to confirm that one or more luminaires in this group of luminaires are malfunctioning. Also, the diagnostic unit 218 may further be configured to intelligently divide the luminaires in the group of luminaires by sequentially deactivating corresponding luminaires. Further, this refinement may continue until one or more malfunctioning luminaires are identified.

In the embodiment of FIG. 2, the street lighting subsystem 201 includes eight luminaires 202-216 that are coupled to the diagnostic unit 218 via the power line 220. If the diagnostic unit 218 receives one or more squawk signals, the diagnostic unit 218 may be configured to initiate the sequential testing protocol. In one example, the diagnostic unit 218 may be configured to deactivate the luminaires 202, 204, 206, 208 and verify whether the squawk signals are still being received by the diagnostic unit 218. If it is determined that the diagnostic unit 218 continues to receive the squawk signals, the diagnostic unit 218 may deactivate the luminaires 210, 212 and activate the luminaires 202-208. If the diagnostic unit 218 does not receive any squawk signals after deactivating the luminaires 210, 212, the diagnostic unit 218 may be configured to determine that one or both of the luminaires 210, 212 are malfunctioning. In order to determine if one or both the luminaires 210, 212 are malfunctioning, the diagnostic unit 218 may be configured to deactivate the luminaire 210 and activate the luminaire 212. If the diagnostic unit 218 does not receive any squawk signals, then the diagnostic unit 218 may be configured to confirm that the luminaire 210 is malfunctioning. Otherwise, the diagnostic unit 218 may be configured to confirm that the luminaire 212 is malfunctioning.

Furthermore, in one embodiment, the diagnostic unit 218 may include a sound detector configured to detect the squawk signals that are emitted or radiated into air by the one or more luminaires 202-216. More particularly, the diagnostic unit 218 having the sound detector may be mounted on a vehicle. Further, the vehicle may be driven in the vicinity of the luminaires 202-216 and the diagnostic unit 218 may be configured to monitor for the presence of a sound-based squawk signal and its associated luminaire. In one embodiment, the vehicle may be driven in the vicinity of the luminaires 202-216 and the diagnostic unit 218 may be configured to individually activate and deactivate each of the luminaires 202-216. In one example, the diagnostic unit 218 may be configured to activate each of the luminaires 202-216 by providing the electrical power supply to a corresponding luminaire. Furthermore, the diagnostic unit 218 may be configured to deactivate each of the luminaires 202-216 by decoupling the electrical power supply to the corresponding luminaire. Also, the sound detector in the diagnostic unit 218 may be configured to determine whether the radiation of squawk signals is terminated by deactivating a respective luminaire. This process of activating and deactivating each luminaire is continued until the diagnostic unit 218 identifies one or more malfunctioning luminaires in the system 200. In one another embodiment, the diagnostic unit 218 may be configured to notify an operator that one or more luminaires are malfunctioning. Also, the diagnostic unit 218 may be configured to notify the operator to repair or replace the one or more malfunctioning luminaires.

Figure 3:
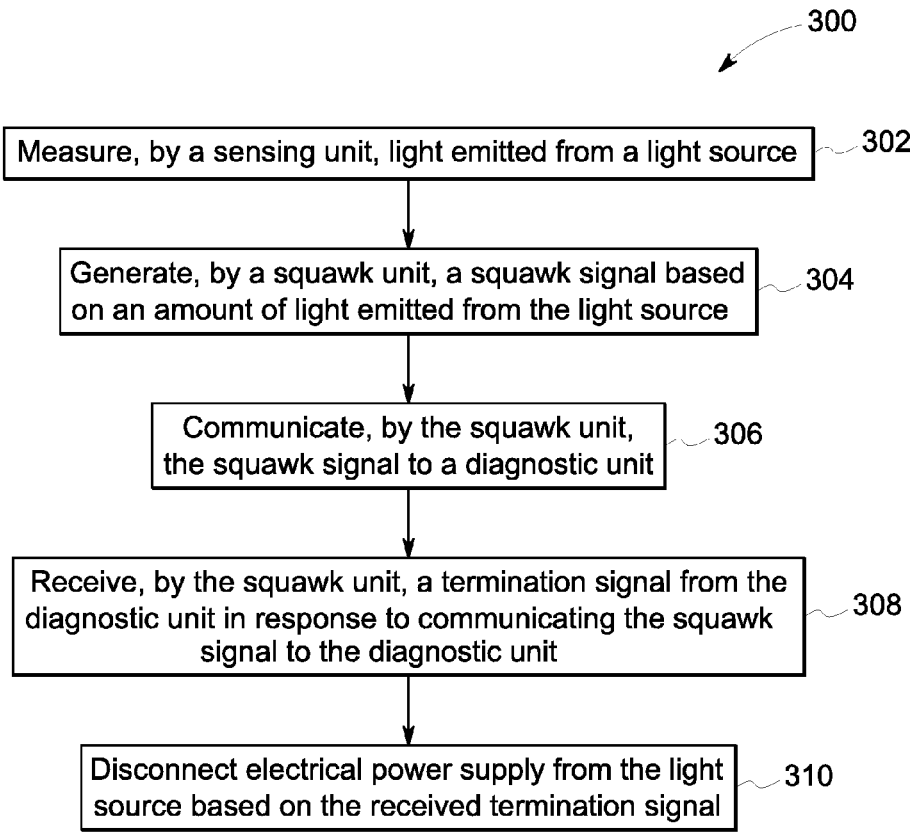
FIG. 3 is a flow chart illustrating a method for monitoring a street lighting subsystem to determine a fault in a light source, in accordance with aspects of the present specification.

Turning to FIG. 3, a flow chart 300 illustrating a method for identifying a faulty luminaire among a plurality of luminaires in a street lighting subsystem, in accordance with aspects of the present specification, is depicted. For ease of understanding, the method 300 is described with reference to the components of FIGS. 1 and 2. The method begins at step 302, where an amount of light emitted from a light source 104 in a luminaire 102 of the street lighting subsystem 100 is sensed or measured. A sensing unit 112 that is disposed in a monitoring device 108 is used to measure the amount of light emitted from the light source 104. In one embodiment, the sensing unit 112 may include one or more photo detectors to sense the light emitted by the light source 104.

Furthermore, at step 304, a squawk signal may be generated based on the amount of light emitted from the light source. A squawk unit 114 in the monitoring device 108 is used to generate the squawk signal. The sensing unit 112 may be configured to verify whether the amount of light emitted from the light source is below a threshold value. If the amount of light emitted from the light source is below the threshold value, the sensing unit 112 may be configured to transmit a triggering signal to the squawk unit 114. Further, in response to receiving the triggering signal, the squawk unit 114 may be configured to generate the squawk signal that is indicative of a fault or malfunction in the light source.

In addition, at step 306, the squawk signal may be communicated to a diagnostic unit 106. The squawk unit 114 may be configured to communicate the squawk signal to the diagnostic unit 106. Particularly, the squawk signal may be transmitted by the squawk unit 114 via a power cable 116 that is used to operatively couple the light source 104 and the diagnostic unit 106. In one embodiment, the squawk unit 114 may aerially transmit the squawk signal towards the diagnostic unit 106. At the other end, the diagnostic unit 106 may use one or more sound detectors to receive the aerially transmitted squawk signals. Further, the diagnostic unit 106 may be configured to process the squawk signal to detect a fault or malfunctioning light source 104.

Subsequently, at step 308, a termination signal may be generated by the diagnostic unit 106. Particularly, the diagnostic unit 106 may be configured to generate the termination signal in response to the squawk signal received by the diagnostic unit 106 from the squawk unit 114. The diagnostic unit 106 may also be configured to communicate the termination signal to the squawk unit 114. The termination signal may be used to decouple electrical power supply to the light source 104 that is malfunctioning.

In accordance with further aspects of the present specification, the diagnostic unit 106, 218 may also be configured to detect a fault or a malfunctioning light source 104 by using a sound detector. More particularly, the sound detector may be included in the diagnostic unit 106, 218 that is mounted on a vehicle. Further, the vehicle may be driven in the vicinity of the luminaires 202-216 and the diagnostic unit 106, 218 may be configured to monitor for the presence of a sound-based squawk signal and an associated luminaire. In another embodiment, the vehicle may be driven in the vicinity of the luminaires 202-216 and the diagnostic unit 106, 218 may be configured to individually activate and deactivate each of the luminaires 202-216. In one example, the diagnostic unit 106, 218 may be configured to activate each of the luminaires 202-216 by providing the electrical power supply to a corresponding luminaire. Furthermore, the diagnostic unit 106, 218 may be configured to deactivate each of the luminaires 202-216 by decoupling the electrical power supply to the corresponding luminaire. Also, the sound detector in the diagnostic unit 106, 218 may be configured to determine whether the radiation of squawk signals is terminated by deactivating a respective luminaire. This process of activating and deactivating the luminaires is continued until the diagnostic unit 106, 218 identifies one or more malfunctioning luminaires in the system 200.

Further, at step 310, the electrical power supply to the light source 104 is decoupled based on the received termination signal. The squawk unit 114 may include an addressable switch 118 that is used to decouple the electrical power supply to the light source 104 when the termination signal is received form the diagnostic unit 106. Also, in one embodiment, the diagnostic unit 106 may be configured to inform an operator to rectify or replace the light source 104 that is malfunctioning.

The various embodiments of the exemplary system and method aid in identifying one or more faulty luminaires among a plurality of luminaires in the street lighting subsystem. Also, the system aids in terminating the electrical power supply to a light source, which in turn saves electrical power in the street lighting subsystem. Also, since the system utilizes the existing power cables for communicating signals between the luminaires and the diagnostic unit, the cost involved in operating and maintaining the system is substantially reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for identifying a fault in a light source, the system comprising:
   a plurality of luminaires arranged along a street, and wherein each of the luminaires comprises:
      the light source coupled to an electrical power supply and configured to emit light based on electrical power received from the electrical power supply;
      a monitoring device disposed proximate to the light source and comprising:
         a sensing unit configured to measure an amount of light emitted by the light source;
         a squawk unit electrically coupled to the sensing unit and configured to generate a squawk signal based on the amount of light emitted from the light source, wherein the squawk signal is indicative of the fault in the light source, and wherein the squawk signal comprises an address associated with a corresponding luminaire;
   a diagnostic unit communicatively coupled to the plurality of luminaires and configured to:
      determine the fault in the light source of the corresponding luminaire based on the squawk signal, wherein the diagnostic unit identifies the corresponding luminaire among the plurality of luminaires based on the address in the squawk signal; and transmit a termination signal to the squawk unit to decouple the electrical power supply from the light source.

2. The system of claim 1, wherein the squawk unit is configured to generate the squawk signal when the amount of light emitted from the light source is below a threshold value.

3. The system of claim 1, wherein the squawk unit is configured to emit the squawk signal into air at an ultrasonic frequency.

4. The system of claim 1, wherein the squawk unit is configured to communicate the squawk signal over a power cable coupling the light source to the diagnostic unit.

5. The system of claim 4, wherein the squawk unit comprises an addressable switch coupled to the power cable and configured to decouple the electrical power supply from the light source based on the termination signal.

6. The system of claim 1, wherein the termination signal comprises an address associated with the at least one luminaire.

7. The system of claim 6, wherein the diagnostic unit is configured to communicate the termination signal to the squawk unit coupled to the light source corresponding to the address.

8. A luminaire system, comprising:
a light source coupled to an electrical power supply and configured to emit light based on electrical power received from the electrical power supply;
a sensing unit disposed proximate to the light source and configured to measure an amount of light emitted from the light source;
a squawk unit electrically coupled to the sensing unit and configured to:
generate a squawk signal based on the amount of light emitted from the light source, wherein the squawk signal is indicative of a fault in the light source, and wherein the squawk signal comprises an address associated with the luminaire system;
communicate the squawk signal comprising the address associated with the luminaire system to a diagnostic unit, wherein the diagnostic unit identifies the luminaire system based on the address in the squawk signal; and
decouple the electrical power supply from the light source based on a termination signal received from the diagnostic unit.

9. The luminaire system of claim 8, wherein the squawk unit is configured to generate the squawk signal until the electrical power supply is decoupled from the light source.

10. The luminaire system of claim 8, wherein the squawk signal comprises at least one tone at a determined frequency, and wherein the at least one tone corresponds to the fault in the light source.

11. The system of claim 8, wherein the diagnostic unit is configured to communicate a signal indicative of the fault in the light source to an operator device.

12. The luminaire system of claim 8, wherein the termination signal comprises an address associated with the luminaire system.

13. The luminaire system of claim 12, wherein the diagnostic unit is configured to communicate the termination signal to the squawk unit coupled to the light source corresponding to the address.

14. A method for identifying a fault in at least one of a plurality of luminaires, the method comprising:
measuring, by a sensing unit, light emitted from a light source of a corresponding luminaire;
generating, by a squawk unit, a squawk signal when an amount of light emitted from the light source is below a threshold value, wherein the squawk signal is indicative of a fault in the light source, and wherein the squawk signal comprises an address associated with the corresponding luminaire;
communicating, by the squawk unit, the squawk signal comprising the address associated with the corresponding luminaire to a diagnostic unit, wherein the diagnostic unit identifies the corresponding luminaire among the plurality of luminaires based on the address in the squawk signal; and
decoupling an electrical power supply from the light source based on a termination signal received from the diagnostic unit.

15. The method of claim 14, wherein communicating the squawk signal comprises transmitting the squawk signal over a power cable coupling the squawk unit to the diagnostic unit.

* * * * *